United States Patent [19]
Dietz et al.

[11] Patent Number: 5,834,064
[45] Date of Patent: Nov. 10, 1998

[54] EFFECT COATINGS WHOSE PERCEIVED COLOR DEPENDS ON THE VIEWING ANGLE

[75] Inventors: Erwin Dietz, Königstein; Axel Schönfeld, Wiesbaden; Willi Kreuder, Mainz, all of Germany

[73] Assignee: Hoechst Aktiengesellschaft, Frankfurt, Germany

[21] Appl. No.: 831,526

[22] Filed: Apr. 1, 1997

[30] Foreign Application Priority Data

Apr. 1, 1996 [DE] Germany .................. 196 12 975.3

[51] Int. Cl.$^6$ .............................. B05D 3/02; B05D 7/16; C09K 19/02; C09K 19/42
[52] U.S. Cl. .................... 427/388.1; 427/393.5; 427/409; 427/412.1; 428/1; 252/299.4; 252/299.5; 252/299.61; 252/299.63
[58] Field of Search .............. 428/1; 252/299.4, 252/299.5, 299.6, 299.61, 299.63; 427/409, 412.1, 388.1, 393.5

[56] References Cited

U.S. PATENT DOCUMENTS

| | | | |
|---|---|---|---|
| 4,410,570 | 10/1983 | Kreuzer et al. | 427/374.1 |
| 4,980,081 | 12/1990 | Ringsdorf et al. | 252/299.01 |
| 5,093,025 | 3/1992 | Koide et al. | 252/299.01 |
| 5,362,315 | 11/1994 | Müller-Rees et al. | 106/493 |

FOREIGN PATENT DOCUMENTS

| | | |
|---|---|---|
| 0391368 | 2/1994 | European Pat. Off. . |
| 0 699 722 | 3/1996 | European Pat. Off. . |
| 0 727 472 | 8/1996 | European Pat. Off. . |
| 4240743 | 6/1994 | Germany . |
| 44 18 075 | 11/1995 | Germany . |
| 4416993 | 11/1995 | Germany . |

OTHER PUBLICATIONS

Translation of EP699722, Mar. 1996.

*Primary Examiner*—Erma Cameron
*Attorney, Agent, or Firm*—Susan S. Jackson

[57] ABSTRACT

A process for preparing an effect coating having a perceived color which is dependent on the viewing angle, which comprises applying one or more non-curable cholesteric liquid-crystalline polymers, or at least one non-curable nematic liquid-crystalline polymer and at least one non-curable cholesteric liquid-crystalline polymer, in the form of a melt or in solution, to the article that is to be coated, and converting the applied polymer by temperature treatment into a film having a perceived color which is dependent on the viewing angle.

16 Claims, No Drawings

EFFECT COATINGS WHOSE PERCEIVED COLOR DEPENDS ON THE VIEWING ANGLE

The invention relates to cholesteric effect coatings having a perceived color which is bright and is dependent on the viewing angle, referred to as cholesteric effect coatings, to processes for their preparation, and to their use.

Customary coating materials and applied coatings contain color-imparting pigments which are dispersed in a transparent binder and are, in general, absorption pigments and interference pigments.

There are also special-effect pigments which consist of platelet-shaped cholesteric liquid-crystal networks (U.S. Pat. No. 5,362,315 and U.S. Pat. No. 4,410,570) or else special-effect pigments in which small mica flakes are coated uniformly on all sides with a crosslinked, liquid-crystalline polymer in chiral-nematic configuration.

The colored appearance of such liquid-crystalline pigments comes about by selective reflection at the helix of the cholesteric structure. Of the incident light, the only light-waves reflected are those whose wavelengths coincide with the pitch of the helical superstructure of the liquid-crystalline polymers, while the light components of other wavelengths pass through the transparent coating vehicle and are absorbed by the—preferably—dark substrate. Platelet-shaped, liquid-crystal network pigments of this kind, aligned parallel to the coated surface, have a certain color when viewed orthogonally, which on viewing from an inclined direction shifts continuously to shorter-wave colors. This viewing-angle-dependent colored appearance of the coated surface gives the coating great effect and is particularly desirable for certain applications. A disadvantage is the laborious and expensive preparation of the described pigments over a number of synthesis steps. Another disadvantage is the low temperature stability of the liquid-crystal networks, which is a result of the temperature-sensitivity of the siloxanes and of the cholesterol (chiral component). In addition, the pigments consisting of liquid-crystal networks are swellable in numerous coating materials, leading to an expansion of the helix in the liquid-crystalline structure. Such an expansion of the helical pitch results in a change in the reflected color. As the pitch increases, longer-wave colors are reflected, and when swelling of the helix is too great the reflected lightwaves may lie outside the visible region, so that there is no longer any color effect. This means that such pigments cannot be used under the conditions which are customary, for example, in the OEM finishing of automobiles. Since only part of the mesogens contains crosslinkable groups, in the case of incomplete crosslinking of the liquid crystals it must also be expected that the helix will change in its structure over the course of time, leading to a change in the color if not to its complete loss. The mesogens are, in general, linked with a cyclic siloxane which at the service temperatures of the pigment is far above its glass transition temperature, with the likely consequence of a molecular dynamic leading to the breakdown of the helical structure.

DE 44 16 993 A1 describes effect coatings in which the pigment can be applied without binders. However, in accordance with the information in this document, this is only possible with curable liquid-crystalline polymers, using high-boiling solvents. The polymer described in DE-A44 16 993 is based on 4-hydroxyphenyl 3-hydroxy-2-methylpropyl sulfide as chiral component, whose preparation necessitates a laborious synthesis. The liquid-crystal polymers are soluble in solvents, with the result that, here too, swelling problems with a clearcoat occur, leading likewise to a change in the pitch and thus to a change in the color properties. Also, the compounds involved in this case are not pigments as normally understood by the skilled worker, since they are soluble in numerous solvents. Furthermore, precise establishment of color is difficult with these systems, since color is only established on the coated surface of the article, and even small differences in temperature lead to marked differences in shade.

The object of the present invention was to develop effect coating systems which are easy to process and which overcome the disadvantages of the prior art.

It has been found that effect coatings having a perceived color which is dependent on the viewing angle can, surprisingly, be prepared, from the solution or from the melt, from one or more cholesteric liquid-crystalline polymers which are not curable.

The present invention provides a process for preparing effect coatings having a perceived color which is dependent on the viewing angle, which comprises applying at least one non-curable cholesteric liquid-crystalline polymer, or at least one non-curable nematic liquid-crystalline polymer and at least one non-curable cholesteric liquid-crystalline polymer, in the form of a melt or in solution, to the article that is to be coated, and converting the applied polymer by temperature treatment into a film having a perceived color which is dependent on the viewing angle.

The term "non-curable" means that the polymers in question are unable to enter into any crosslinking reactions with themselves or with other reactants, such reactions being those which can occur, for example, as a result of light-induced crosslinking in the case of the cinnamic acid derivatives used in DE-A-44 16 993.

The term "effect" is understood in the present invention to refer not only to the viewing-angle-dependent selective reflections in the visible region but also to selective reflections in the UV and IR region. The latter selective reflections, although not perceptible to the human eye, can nevertheless be determined readily using UV and IR spectrometers.

The effect coatings prepared in accordance with the invention consist of cholesteric liquid-crystalline polymers (cLCPs) which possess a helical superstructure. This superstructure leads on the one hand to the material no longer having the anisotropy of the mechanical properties that is customary with nematic liquid-crystal polymers. On the other hand, the material shows pronounced color effects. These effects are based on the selective reflection of the incident light at the helical superstructure. The precise reflection color in this context depends on the viewing angle and, in particular, on the pitch of the helix. For any given viewing angle—for example a perpendicular view down onto a sample—the apparent reflection color is a color with a wavelength which corresponds to the pitch of the helical superstructure. This means that the wavelength of the reflected light is shorter the shorter the pitch of the helix. The helical pitch which develops depends essentially on the proportion of the chiral comonomer in the overall composition, on the nature of incorporation into the polymer, on the degree of polymerization and on the structure of the chiral comonomer ("helical twisting power"). Moreover, many systems also exhibit a more or less pronounced temperature-dependency of the pitch in the cholesteric phase, and thus also a variation in the color properties. It is readily possible, by varying the proportion of the chiral comonomer, for example, to prepare a polymer with a blue, green or gold color effect.

Polymers which can be used as cLCPs in accordance with the invention are all cholesteric liquid-crystalline main-chain polymers and also cholesteric liquid-crystalline side-group polymers, or combined main-chain/side-group polymers.

Examples of cholesteric side-group polymers are polysiloxanes, cyclic siloxanes, polyacrylates or polymethacrylates in non-curable form, with mesogens in the side groups. The mesogens in the side group can comprise all structures known to the skilled worker, for example cholesterol-substituted phenylbenzoates or biphenols.

Cholesteric main-chain polymers are generally prepared from a chiral component and from hydroxycarboxylic acids and/or a combination of dicarboxylic acids and diols. In general, the polymers consist essentially of aromatic constituents. It is, however, also possible to employ aliphatic and cycloaliphatic components, for example cyclohexanedicarboxylic acid.

In the context of the present invention, preference is given to cholesteric liquid-crystalline main-chain polymers consisting essentially of a) from 0 to 99.9 mol % of at least one compound from the group consisting of aromatic hydroxycarboxylic acids, cycloaliphatic hydroxycarboxylic acids and aromatic aminocarboxylic acids;

b) from 0 to 49.95 mol % of at least one compound from the group consisting of aromatic dicarboxylic acids and cycloaliphatic dicarboxylic acids;

c) from 0 to 49.95 mol % of at least one compound from the group consisting of aromatic diols, cycloaliphatic diols and aromatic diamines;

d) from 0.1 to 40 mol %, preferably from 1 to 25 mol %, of chiral, acyclic and/or monocyclic bifunctional comonomers; and e) from 0 to 5 mol % of a branchable component having more than two functional groups, the sum adding up to 100 mol %.

In the case of the percentages indicated care should be taken that the stoichiometry of the functional groups, which is known to the skilled worker, for the polycondensation is ensured.

In addition, the polymers may also comprise components having more than two functional groups, for example dihydroxybenzoic acids, trihydroxybenzenes or trimellitic acid. These components act as a branching site in the polymer and must only be added in low concentrations, for example from 0 to 5 mol %, so as to avoid crosslinking of the material.

Particular preference is given to cholesteric main-chain polymers which are composed of the following units of the individual monomer groups:

a) aromatic hydroxycarboxylic acids, aminocarboxylic acids:

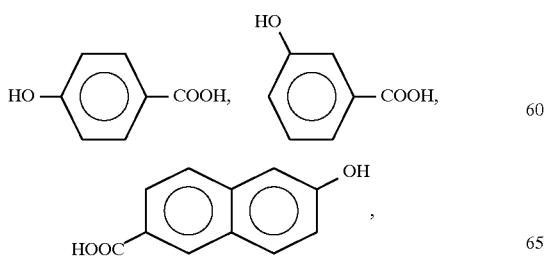

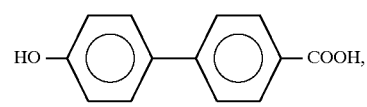

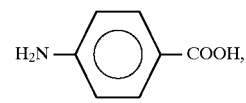

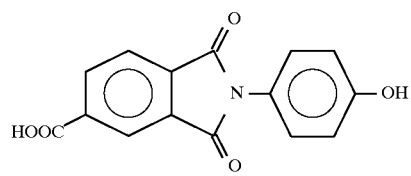

b) aromatic dicarboxylic acids, aliphatic dicarboxylic acids:

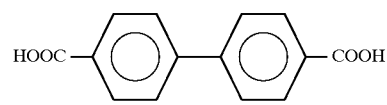

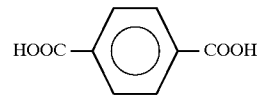

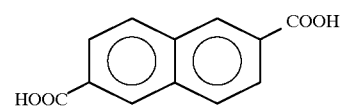

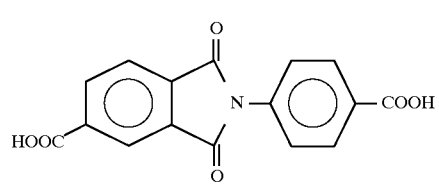

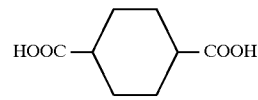

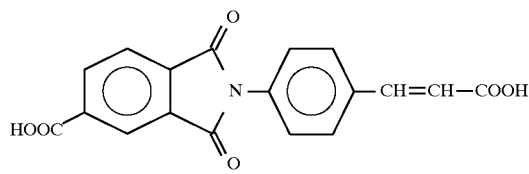

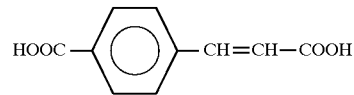

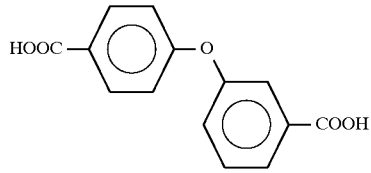

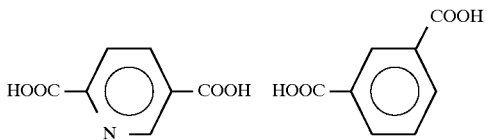

c) aromatic diols, aminophenols, aromatic diamines:

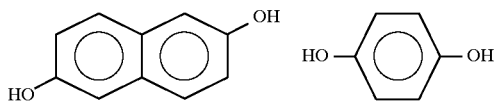

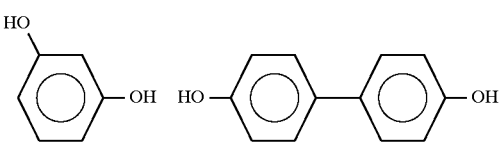

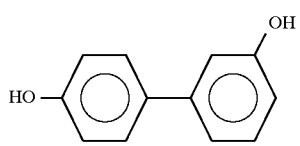

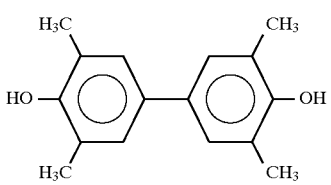

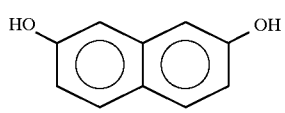

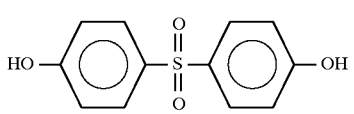

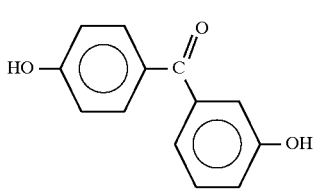

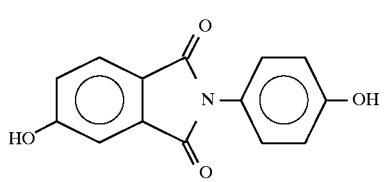

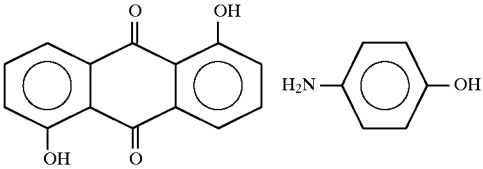

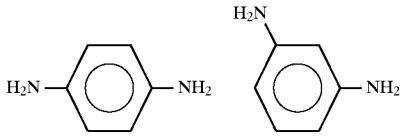

d) chiral, bifunctional monomers:

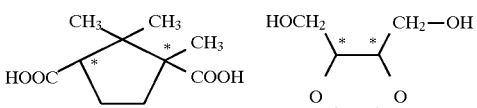

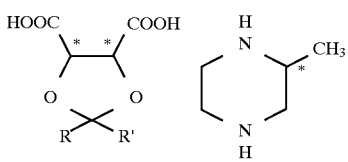

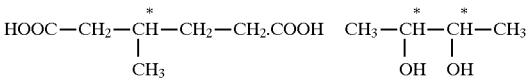

in which R and R', each independently of one another, are H, $C_1$–$C_6$-alkyl or phenyl, preferably H or $CH_3$.

Particularly preferred cLCPs are polymers comprising camphoric acid as chiral component and also p-hydroxybenzoic acid and/or 2-hydroxy-6-naphthoic acid and/or terephthalic acid and/or isophthalic acid and/or hydroquinone and/or resorcinol and/or 4,4'-dihydroxybiphenyl and/or 2,6-naphthalenedicarboxylic acid.

The chiral comonomers are preferably employed in an enantiomerically pure form. Where enantiomer mixtures of a comonomer are used, care should be taken to ensure that one enantiomer form is present in an effective excess.

Either the monomers employed in accordance with the invention can be employed directly, or else expedient precursors can be used that react under the subsequent reaction conditions to form the desired monomers. Thus, for example, aminophenol and trimellitic anhydride can be employed in place of N-(4-hydroxyphenyl)trimellitimide.

The polycondensation can be carried out by way of all polycondensation techniques known to the skilled worker. A suitable example is the melt condensation with acetic anhydride that is described in U.S. Pat. No. 5,093,025.

Linkage of the monomers preferably takes place by way of ester linkages (polyester) and/or by way of amide linkages (polyesteramide/polyamide), although linkage can also take place by way of other types of linkage known to the skilled worker, for example polyesterimide.

When selecting the monomer units care should be taken that the stoichiometry of the functional groups, which is known to the skilled worker, is ensured; i.e., that functional groups which react with one another in the polycondensation reaction are employed in appropriate proportions. For example, when using dicarboxylic acids and diols, the number of hydroxyl groups present must correspond to the number of carboxyl groups. In a further embodiment, however, it is possible in order to vary the molecular weight to employ monomers from groups b) to d), or the listed components having more than two functional groups, in an excess which is necessary to achieve a defined molecular weight. In addition, the molecular weight can be influenced by the use of monofunctional monomers.

In place of the carboxylic acids it is also possible to employ other carboxylic acid derivatives known to the skilled worker, examples being acid chlorides or carboxylic esters. Instead of the hydroxy components it is also possible to employ corresponding hydroxy derivatives, such as the acetylated hydroxy compounds, for example.

The polymer units described may also comprise further substituents, examples being methyl, methoxy or halogen.

It is also possible to prepare cholesteric liquid-crystalline polymers by mixing colorless and/or colored nematic and/or cholesteric liquid-crystalline polymers. In that case, the shade of the effect coating can be adjusted exactly and varied within wide ranges.

Particularly suitable nematic liquid-crystalline polymers are those comprising p-hydroxybenzoic acid and/or 2-hydroxy-6-naphthoic acid; 2,6-naphthalenedicarboxylic acid, terephthalic acid and/or isophthalic acid; hydroquinone, resorcinol and/or 4,4'-dihydroxybiphenyl.

When main-chain polymers are used the cLCPs, in a preferred embodiment, have a very low solubility, as a result of which their molecular weights cannot be determined by customary methods (GPC, light scattering). As a measure of the molecular weight it is possible to employ the intrinsic viscosity of the polymers in a solution of pentafluorophenol/hexafluoroisopropanol. Suitable polymers are those having an intrinsic viscosity of between 0.1 dl/g and 10 dl/g.

The preferred main-chain polymers are of high thermal stability and, owing to their poor solubility, are of outstanding stability relative to the solvents which are used in coating materials. They therefore render superfluous crosslinking reactions following application to the substrate surface. As a result of this, both application and synthesis are simplified considerably.

There are a number of options for preparing cholesteric effect coatings:

A preferred possibility for converting the cholesteric liquid-crystalline polymers in effect coatings is solution coating. In this method, the polymer is dissolved in a solvent, and a film is applied from the solution to the substrate that is to be coated. This can take place, for example, by spraying, knife coating, flow coating, dipping or using a brush. After the solvent has been evaporated, the polymer forms a bright effect coating.

A further preferred possibility for converting the cholesteric liquid-crystalline polymers into effect coatings is that of melt coating. In this case, the polymer is applied to the substrate in the melt, or is melted on the substrate and processed to form a thin coat. The polymer is suitably applied using, for example, a heatable doctor blade. However, application can also be carried out by more simple means, for example a filling knife.

Another possibility of converting the cholesteric liquid-crystalline polymers into effect coatings is that of powder coating. In this case, the polymer is ground to the desired particle size in a first step using known milling apparatus. The powder is then applied by known methods, for example flame spraying processes, corona processes, a triboelectric process or fluidized-bed sintering processes.

After the process of application to the article, the powder coat is heated at temperatures above the softening point of the powder, where the polymers form a homogeneous film and the helical superstructures develop. The temperature at which development of the helical structure begins is referred to below as the chiralization temperature.

The specific optical properties of the novel effect coatings are only observed if the molecules develop the helical structure above the chiralization temperature of the polymer. Transition to the cholesteric phase takes place in many cases even during the synthesis of the polymers. The wavelength of the selective reflection of the cLCPs employed in accordance with the invention is determined by the pitch of the helical structure. The pitch depends on the structure of the polymer, the melt viscosity, the presence of solvents and, in particular, the helical twisting power of the chiral monomer. It is additionally a function of temperature. Correspondingly, the pitch of the helix can also be established by way of the temperature. By rapid cooling of the coated substrates, the pitch of the helix, and thus the selective reflection, can be "frozen in" permanently. In the case of slow cooling, changes in color must be expected. In general, colored substrates are also obtained by this method. However, it is difficult to define the final color properties beforehand. If the cooled substrate is again heated, then new helical pitches, or even the same helical pitches again, and thus the wavelength of selective reflection can be established. Through this procedure it is possible to correct and vary the color properties of the coated substrate in a simple manner. For use in practice it is important that the melting point and the chiralization temperature of the polymer are above the service temperature of the coated substrate.

The development of the helical structure can be promoted not only by temperature and the action of shear forces but also by substrates with polymeric coats, for example polyvinyl alcohol, cellulose derivatives and polyimides. The orientation process of the polymer molecules can also, depending on the structure of the polymers, be positively influenced by electrical and magnetic fields.

The novel effect coatings can be applied to a wide variety of substrates. These substrates may, for example, be articles made of natural and synthetic materials, for example wood, plastics, metal or glass. If the effect coating is applied without a prior coating, then it is advisable to apply it in a coat thickness which masks the substrate. It is of course also possible to apply a plurality of coats or to prepare semi-transparent coatings. Particular preference is given to coating the bodywork, or bodywork parts, of motor vehicles.

In preferred cases the effect powder coating is applied to metal or plastic substrates. In most cases these carry a prior coat. In other words, plastic substrates can be provided with a plastics primer, and metallic substrates generally have an electrophoretically applied primer and, if desired, one or more further coats, for example a filler coat.

Particular preference is given to dark substrate. The term substrate in this context refers not only to a substrate whose surface has been provided with a dark coat, but also to an inherently dark-colored substrate, for example a plastics substrate or a metal substrate that has been coated with a dark oxide layer. Examples of dark coats are electrophoretically applied or spray-applied or powder-applied primers, plastics primers, filler coats and anti-stonechip coats, or else solid-color basecoats and topcoats. Examples of dark substrates are dark red, dark blue, dark green, dark brown, dark gray and, in particular, black. The effect coatings can also be applied to light-colored substrates or in hiding coats. In that case, however, the viewing-angle-dependent perceived color is evident only to a weakened extent.

The effect coatings can be coated by customary methods with a clearcoat. Suitable clearcoats are, in principle, all known clearcoats or transparent-pigmented coating compositions. In this context it is possible to employ both solvent-containing one-component or two-component coating materials and also, preferably, water-dilutable clearcoats and powder coatings. In some cases it may be expedient to choose a somewhat greater clearcoat thickness, or to apply 2 clearcoats comprising identical or different liquid clearcoats or transparent powder coatings. As is known, the clearcoat contains further auxiliaries which enhance the surface properties of the coated articles. Mention may be made, for example, of UV stabilizers and light stabilizers, which protect the underlying coats against degradation reactions.

Prior to or during application, the effect coatings can have added to them further substances as are conventional in the case of plastics processing and coating techniques. Mention may be made, for example, of polymers other than liquid-crystalline polymers, charge control agents, absorption pigments and interference pigments, fillers, adhesion promoters, light stabilizers, other stabilizers, and substances which influence the rheology and leveling.

The effect coatings can be prepared with a few simple process steps, in high yield and without the production of a non-reutilizable waste. In addition to their ease of processing they are notable for high temperature stability, solvent resistance and chemical resistance, and very bright shades, with pronounced dependency of the perceived color on the viewing angle.

In the examples which follow, parts are by weight.

EXAMPLE 1

Synthesis of a cLCP:

2821 parts of 2-hydroxy-6-naphthoic acid, 6215 parts of 4-hydroxybenzoic acid, 3724 parts of 4,4'-dihydroxybiphenyl and 3203 parts of (R)-(+)-3-methyladipic acid are placed in a reactor, 10,460 parts of acetic anhydride are added, and a gentle stream of nitrogen is flushed through. The mixture is heated to 140° C. over the course of 15 minutes and held at this temperature for 20 minutes. The temperature is then raised to 320° C. over the course of 150 minutes, and the melt is held at this temperature for 15 minutes. From about 220° C., acetic acid begins to distill off. Nitrogen flushing is subsequently ended, and reduced pressure is applied. The melt is stirred for 30 minutes more under reduced pressure (about 5 mbar). The polymer is then blanketed with nitrogen, cooled and isolated. When viewed perpendicularly, the polymer shows a bright gold color which on viewing at an oblique angle appears greenish.

EXAMPLE 2

Synthesis of a cLCP:

14,110 parts of 2-hydroxy-6-naphthoic acid, 31,077 parts of 4-hydroxybenzoic acid, 18,621 parts of 4,4'-dihydroxybiphenyl and 3203 parts of (1R,3S)-(+)-camphoric acid are placed in a reactor, 52,580 parts of acetic anhydride are added, and a gentle stream of nitrogen is flushed through. The mixture is heated to 140° C. over the course of 15 minutes and held at this temperature for 20 minutes. The temperature is then raised to 330° C. over the course of 150 minutes, and the melt is held at this temperature for 15 minutes. From about 220° C., acetic acid begins to distill off. Nitrogen flushing is subsequently ended, and reduced pressure is applied. The melt is stirred for 30 minutes more under reduced pressure (about 5 mbar). The polymer is then blanketed with nitrogen, cooled and isolated. When viewed perpendicularly, the polymer shows a bright gold color which on viewing at an oblique angle appears blue-green.

EXAMPLE 3

Coating of a Metal Panel 200 mg of polymer from Example 1 are compressed at 50 bar in a melt press at 260° C. After cooling, the metal panel has a very bright gold color which appears green when viewed obliquely.

EXAMPLE 4

Preparation of a Fine Polymer Powder

The polymer from Example 2 is ground using a universal mill to a particle size <1 mm. Final milling takes place using a high-performance ultracentrifugal mill having a 0.15 mm sieve separator. A powder with a particle size <150 $\mu$m is obtained.

EXAMPLE 5

Coating of a Clay Figure

The polymer powder prepared in Example 4 is placed in the powder container of the spraying apparatus "®Tribostar" from Intec, Dortmund. The spraying apparatus is fitted with a standard spraying pipe and a star-shaped inner rod. This spraying apparatus is used to coat a clay figure by crosswise application in a spraybooth from Intec, Dortmund, at a high powder throughput and at a spray pressure of 3 bar. For film formation, the coated clay figure is heated at 235° C. for 10 minutes and then immersed in water. A homogeneous coating with a thickness of about 25 $\mu$m is obtained which when viewed at a perpendicular angle shows a bright gold color and when viewed at an oblique angle shows a bright bluish green color.

EXAMPLE 6

Preparation of an Effect Coating Comprising Platelet-Shaped Film Shreds

A melt press is used to press films from the polymer of Example 2, at a temperature of 270° C. and under a pressure of 50 bar. 0.15 g of polymer is used for each pressing. This operation is carried out until 5 g of pressed films are present. These films are ground into small film shreds with a diameter of 60 $\mu$m. The film shreds are dispersed, like a conventional pigment, in a customary binder. This coating material is sprayed onto a black-primed metal panel and is provided with a clearcoat film. A very bright coated metal panel is obtained, with a gold color which appears bluish green when viewed obliquely.

EXAMPLE 7

Coating of Paper 0.25 g of polymer from Example 2 is pressed onto a sheet of conventional paper in a melt press at 220° C. under a pressure of 150 bar. A very bright, gold coating is obtained which appears greenish blue when viewed at an oblique angle.

We claim:

1. A process for providing an article with a selectively reflective coating having a perceived color which is dependent on the viewing angle, which comprises: applying to said article at least one non-curable cholesteric liquid-crystalline polymer, or at least one non-curable nematic liquid-crystalline polymer and at least one non-curable cholesteric liquid-crystalline polymer, in the form of a melt or in solution, and converting the thus-applied polymer by temperature treatment into a film having a perceived color which is dependent on the viewing angle.

2. The process as claimed in claim 1, wherein the non-curable cholesteric liquid-crystalline polymer is a cholesteric liquid-crystalline main-chain polymer.

3. The process as claimed in claim 1, wherein the non-curable cholesteric liquid-crystalline polymer and, optionally, the non-curable nematic liquid-crystalline polymer are prepared in powder form by polymerization in an emulsified or dispersed phase.

4. The process as claimed in claim 1, wherein the selectively reflective coating is applied to a dark substrate background or primer.

5. The process as claimed in claim 4, wherein the substrate background or primer is black.

6. The process as claimed in claim 1, wherein the selectively reflective coating is coated with one or more clearcoat films.

7. The process as claimed in claim 2, wherein the cholesteric liquid-crystalline main-chain polymer consists essentially of a liquid-crystalline polyester.

8. The process as claimed in claim 2, wherein the cholesteric liquid-crystalline main-chain polymer consists essentially of the reaction product of the components comprising:

a) from 0 to 99.9 mol % of at least one aromatic hydroxycarboxylic acid, cycloaliphatic hydroxycarboxylic acid or aromatic aminocarboxylic acid;

b) from 0 to 49.95 mol % of at least one aromatic dicarboxylic acid or cycloaliphatic dicarboxylic acid;

c) from 0 to 49.95 mol % of at least one aromatic diol, cycloaliphatic diol or aromatic diamine;

d) from 0.1 to 40 mol % of chiral acyclic bifunctional comonomer, chiral monocyclic bifunctional comonomer or a combination thereof, and e) from 0 to 5 mol % of a branchable component having more than 2 functional groups.

9. The process as claimed in claim 8, wherein the chiral, bifunctional comonomer of component d) is a compound of the formula

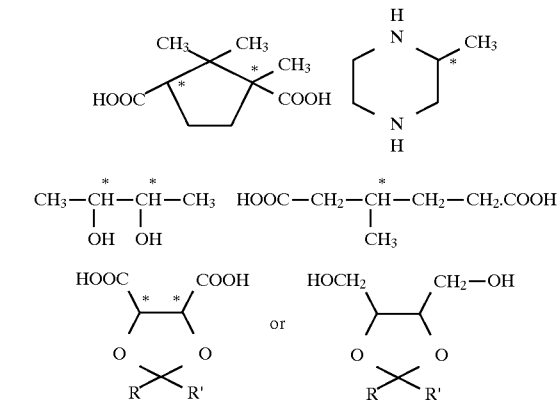

10. The process as claimed in claim 8, wherein the sum of said components a) through e) adds up to 100 mol %.

11. The process as claimed in claim 10, wherein the amount of component d) ranges from 2 to 25 mol %.

12. The process as claimed in claim 1, wherein a non-liquid-crystalline additive is admixed with said polymer or polymers, while said polymer or polymers is or are in the form of a melt or solution.

13. The process as claimed in claim 12, wherein said non-liquid-crystalline additive is an absorption pigment, an interference pigment, a combination of absorption and interference pigments, a charge-control agent, a filler, an adhesion promoter, a stabilizer, or a substance which influences the rheology or leveling of the coating applied to said article.

14. The process as claimed in claim 1, wherein said article comprises metal.

15. The process as claimed in claim 1, wherein said article comprises plastic.

16. The process as claimed in claim 1, wherein said article is a motor vehicle bodywork part.

* * * * *